United States Patent
Melman

(10) Patent No.: US 9,026,509 B2
(45) Date of Patent: May 5, 2015

(54) APPARATUS AND METHOD FOR SEARCH AND RETRIEVAL OF DOCUMENTS

(76) Inventor: Haim Zvi Melman, Kfar Saba (IL)

( * ) Notice: Subject to any disclaimer, the term of this patent is extended or adjusted under 35 U.S.C. 154(b) by 0 days.

(21) Appl. No.: 12/613,604

(22) Filed: Nov. 6, 2009

(65) Prior Publication Data

US 2010/0106717 A1    Apr. 29, 2010

Related U.S. Application Data

(60) Division of application No. 10/905,297, filed on Dec. 25, 2004, which is a continuation of application No. 09/398,289, filed on Sep. 20, 1999, now abandoned.

(30) Foreign Application Priority Data

Sep. 27, 1998 (IL) .......................................... 126373

(51) Int. Cl.
  G06F 17/30    (2006.01)
(52) U.S. Cl.
  CPC ...... *G06F 17/30864* (2013.01); *G06F 17/3064* (2013.01); *G06F 17/30696* (2013.01); *G06F 17/30867* (2013.01)
(58) Field of Classification Search
  USPC ....................... 707/723, 706, 999.5, 703, 737
  See application file for complete search history.

(56) References Cited

U.S. PATENT DOCUMENTS

| | | | |
|---|---|---|---|
| 4,774,655 A | 9/1988 | Kollin et al. | |
| 4,799,254 A | 1/1989 | Dayton et al. | |
| 5,278,980 A * | 1/1994 | Pedersen et al. | 1/1 |
| 5,321,833 A | 6/1994 | Chang et al. | |
| 5,410,693 A * | 4/1995 | Yu et al. | 1/1 |
| 5,428,778 A | 6/1995 | Brookes | |
| 5,504,887 A | 4/1996 | Malhotra et al. | |
| 5,544,049 A * | 8/1996 | Henderson et al. | 704/7 |
| 5,576,954 A | 11/1996 | Driscoll | |
| 5,577,239 A | 11/1996 | Moore et al. | |
| 5,642,502 A * | 6/1997 | Driscoll | 1/1 |
| 5,659,732 A | 8/1997 | Kirsch | |
| 5,671,404 A | 9/1997 | Lizée et al. | |
| 5,694,593 A | 12/1997 | Baclawski | |
| 5,721,902 A | 2/1998 | Schultz | |
| 5,742,816 A | 4/1998 | Barr et al. | |
| 5,754,938 A | 5/1998 | Herz et al. | |
| 5,794,237 A | 8/1998 | Gore, Jr. | |

(Continued)

FOREIGN PATENT DOCUMENTS

IL      119183     9/1996

OTHER PUBLICATIONS

Finkelstein, Sheldon, Common Expression Analysis in Database Applications, 1982, ACM 0-89791-073-7/82/006/0235, p. 235-245.

(Continued)

*Primary Examiner* — Noosha Arjomandi

(57) ABSTRACT

A system for the support and management of search for documents is presents. The system includes knowledge-database, query interface and communication to a database of documents to be searched. Information generated during a search session is collected by the system and is added to the knowledge-database. The information is ranked automatically according to the usage of that information by the user. During successive search session, or during search made by other users, the system uses the knowledge-database to support the users with keywords, queries and reference to documents.

29 Claims, 4 Drawing Sheets

(56) References Cited

U.S. PATENT DOCUMENTS

Figure 1:
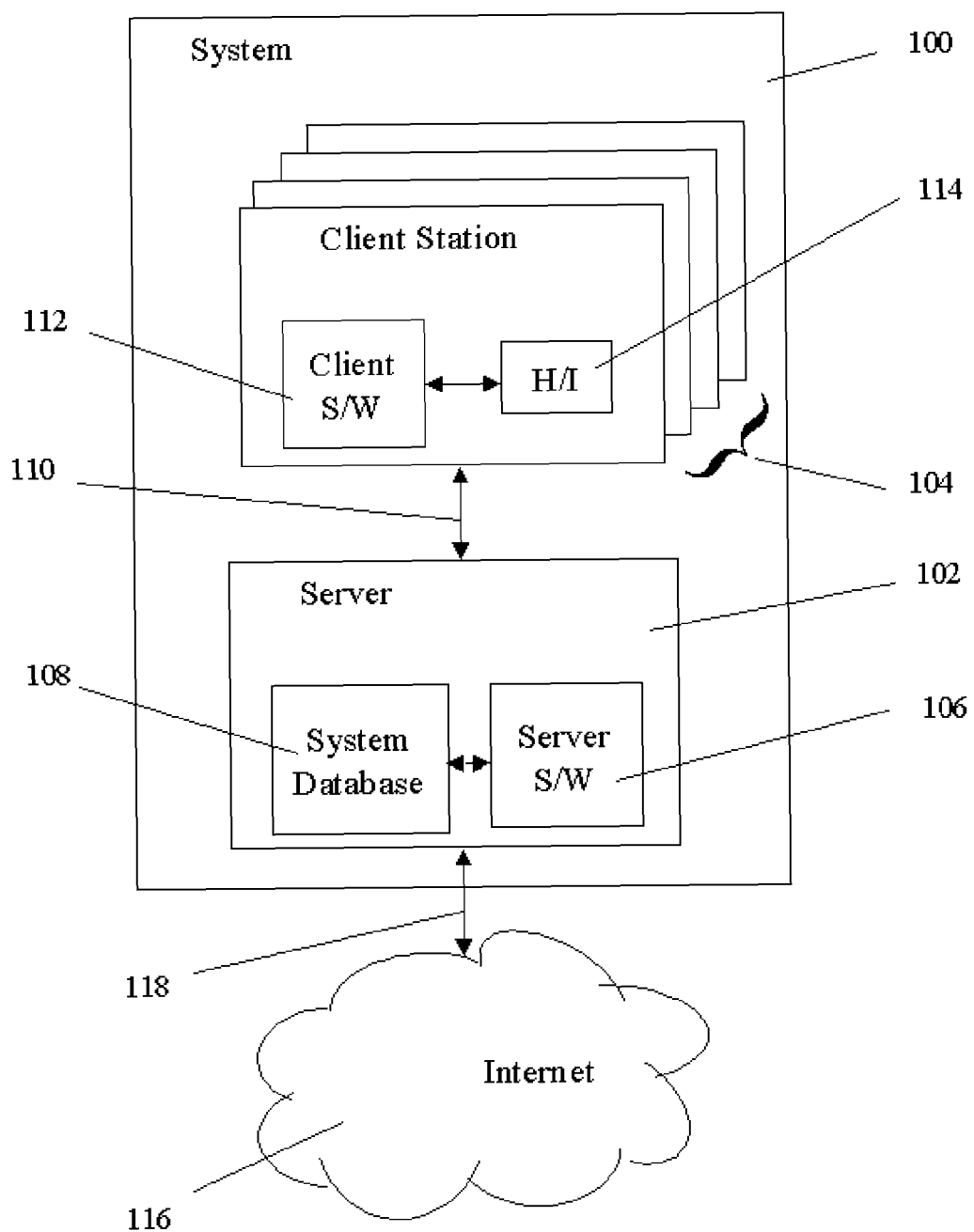

| | | | |
|---|---|---|---|
| 5,805,911 A * | 9/1998 | Miller | 715/234 |
| 5,855,020 A | 12/1998 | Kirsch | |
| 5,864,845 A | 1/1999 | Voorhees et al. | |
| 5,864,846 A | 1/1999 | Voorhees et al. | |
| 5,864,863 A | 1/1999 | Burrows | |
| 5,913,215 A * | 6/1999 | Rubinstein et al. | 707/708 |
| 5,940,821 A | 8/1999 | Wical | |
| 5,956,711 A * | 9/1999 | Sullivan et al. | 1/1 |
| 5,987,457 A * | 11/1999 | Ballard | 1/1 |
| 6,006,222 A * | 12/1999 | Culliss | 1/1 |
| 6,006,225 A * | 12/1999 | Bowman et al. | 1/1 |
| 6,012,055 A * | 1/2000 | Campbell et al. | 1/1 |
| 6,014,665 A * | 1/2000 | Culliss | 707/711 |
| 6,018,344 A | 1/2000 | Harada et al. | |
| 6,029,165 A | 2/2000 | Gable | |
| 6,032,145 A * | 2/2000 | Beall et al. | 1/1 |
| 6,115,718 A | 9/2000 | Huberman et al. | |
| 6,144,958 A * | 11/2000 | Ortega et al. | 1/1 |
| 6,169,986 B1 * | 1/2001 | Bowman et al. | 1/1 |
| 6,185,558 B1 | 2/2001 | Bowman et al. | |
| 6,226,630 B1 * | 5/2001 | Billmers | 1/1 |
| 6,243,091 B1 | 6/2001 | Berstis | |
| 6,256,633 B1 * | 7/2001 | Dharap | 1/1 |
| 6,405,190 B1 * | 6/2002 | Conklin | 1/1 |
| 6,415,282 B1 | 7/2002 | Mukherjea et al. | |
| 6,421,675 B1 | 7/2002 | Ryan et al. | |
| 6,460,060 B1 | 10/2002 | Maddalozzo, Jr. et al. | |
| 6,484,162 B1 * | 11/2002 | Edlund et al. | 1/1 |
| 6,745,178 B1 | 6/2004 | Emens et al. | |
| 2001/0034763 A1 | 10/2001 | Jacobs et al. | |
| 2003/0187837 A1 * | 10/2003 | Culliss | 707/3 |
| 2005/0071325 A1 * | 3/2005 | Bem | 707/3 |
| 2005/0114325 A1 | 5/2005 | Liu et al. | |
| 2006/0041843 A1 | 2/2006 | Billsus et al. | |
| 2008/0250026 A1 | 10/2008 | Linden et al. | |

OTHER PUBLICATIONS

Office Action issued for U.S. Appl. No. 10/905,297 dated Oct. 14, 2011.

* cited by examiner ic # APPARATUS AND METHOD FOR SEARCH AND RETRIEVAL OF DOCUMENTS

FIELD OF THE INVENTION

The invention is related to the field of digital information management and, in particular, to search and retrieval of the same.

BACKGROUND OF THE INVENTION

The growth of the Internet introduced broad access to information not available before. Access to digital information sources, once an asset of a small group of professional, holding information technology skills, has become a daily tool for millions of the Internet users.

Lower skill levels for search of such information is now an inseparable part of searches made for information by most of the users. Skill and knowledge aspects became limiting factors for successful search and retrieve of such information. Such limitations present themselves in the composition of Boolean queries, knowledge of relevant information sources such as the AltaVista index at www.altavista.digital.com (maximum coverage of Internet documents by a single index is less then 40%). Many of the documents are accessed only by a direct reference from a person with a specific knowledge. Many of the information provided by querying an index such as Yahoo are not relevant. The search process is long, queries are modified many times and many information pieces are missed.

Natural language query is one suggested replacement for Boolean query method. However, a research from Search Insider (www.searchinsider.com) indicates clearly that users prefer the Boolean query methods and that search engines such as AltaVista and Yahoo (www.yahoo.com) provide require much improvement.

The present status of information search and retrieval in the Internet is characterized by long and tedious search process, poor relevancy of retrieved documents and low level of success in retrieval of relevant documents.

It is the purpose of the present invention to provide a method and tools for efficient search and retrieval of documents. The description in reference to the Internet is maid in a way of example only. It would be appreciated by those skilled in the art, that the proposed method is applicable to any digital information source.

A SUMMARY OF THE INVENTION

In a preferred embodiment of the present invention, the system comprises a Server, Clients having a Human Interface (H/I) and communication with the server, a Database, a connection to the Internet and Software of that system.

A User of the Client is using the H/I to compose a query view various information pieces including retrieved documents or titles or summary of those documents. The Software traces the user's search activity, collecting data such as queries and relevant or irrelevant documents and information sources. The data is evaluated and stored in the Database.

The data is also compared to other data, collected from all users, available from the Database. A data that is relevant to assist the current search process is presented to the user. This data include highly ranked queries that are similar to the query composed by the current user and highly ranked documents retrieved in the past by those queries.

As the Database is the accumulation of many such search processes, made by many users, in the same subject, the current user can benefit from the many hours invested by others to find information in this subject.

This method is particularly effective when used within an organization, whereas the organization members search for information that is relevant to the activity of that organization. Thus the Database generated overtime is highly relevant to all members of such organization.

The invention will be better understood in reference to the following Figures:

FIG. 1. A general block diagram of a preferred embodiment of the system of the present invention.

Figure 2:
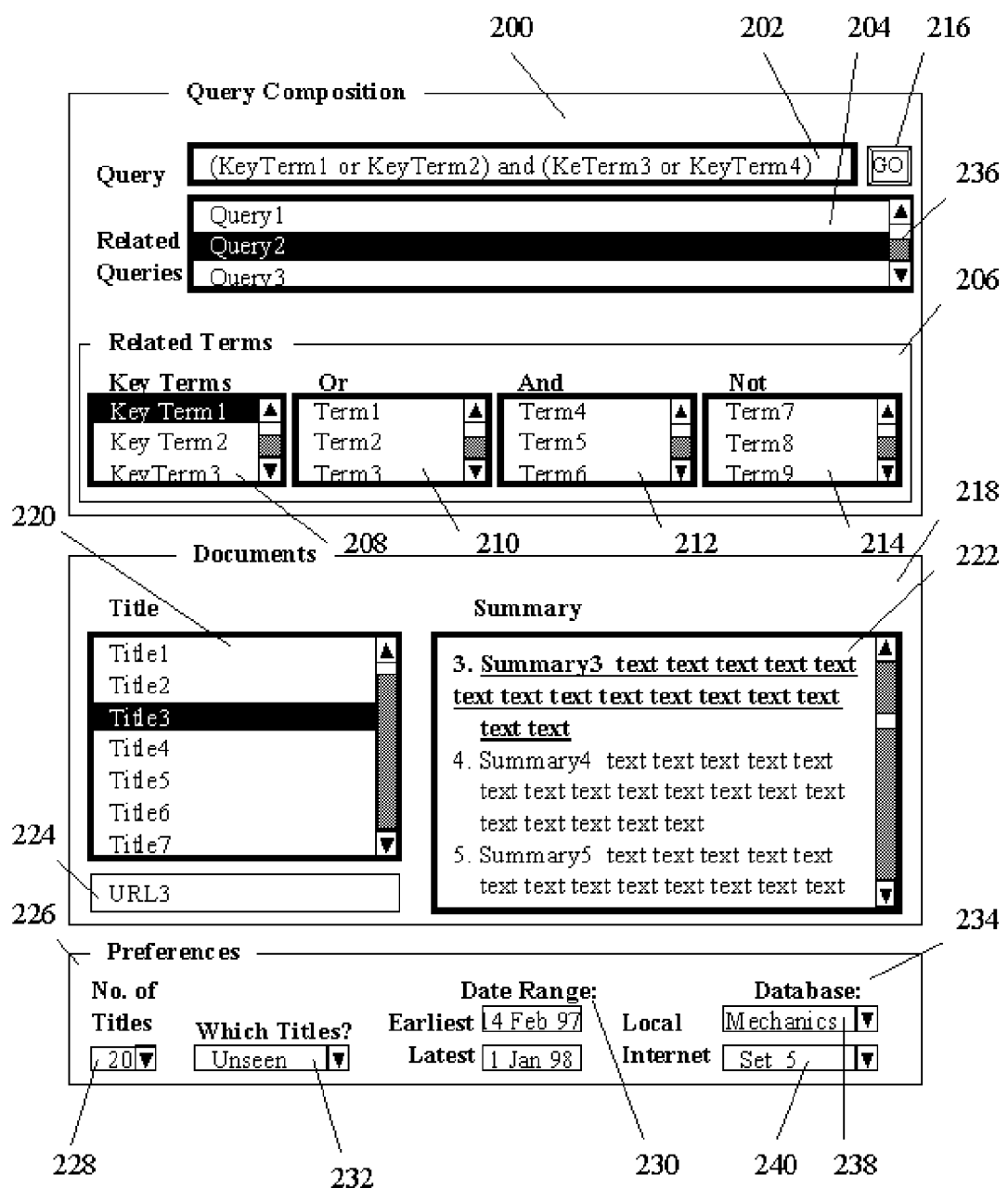

FIG. 2. A description of a preferred embodiment of a Human Interface of the present invention.

Figure 3A:
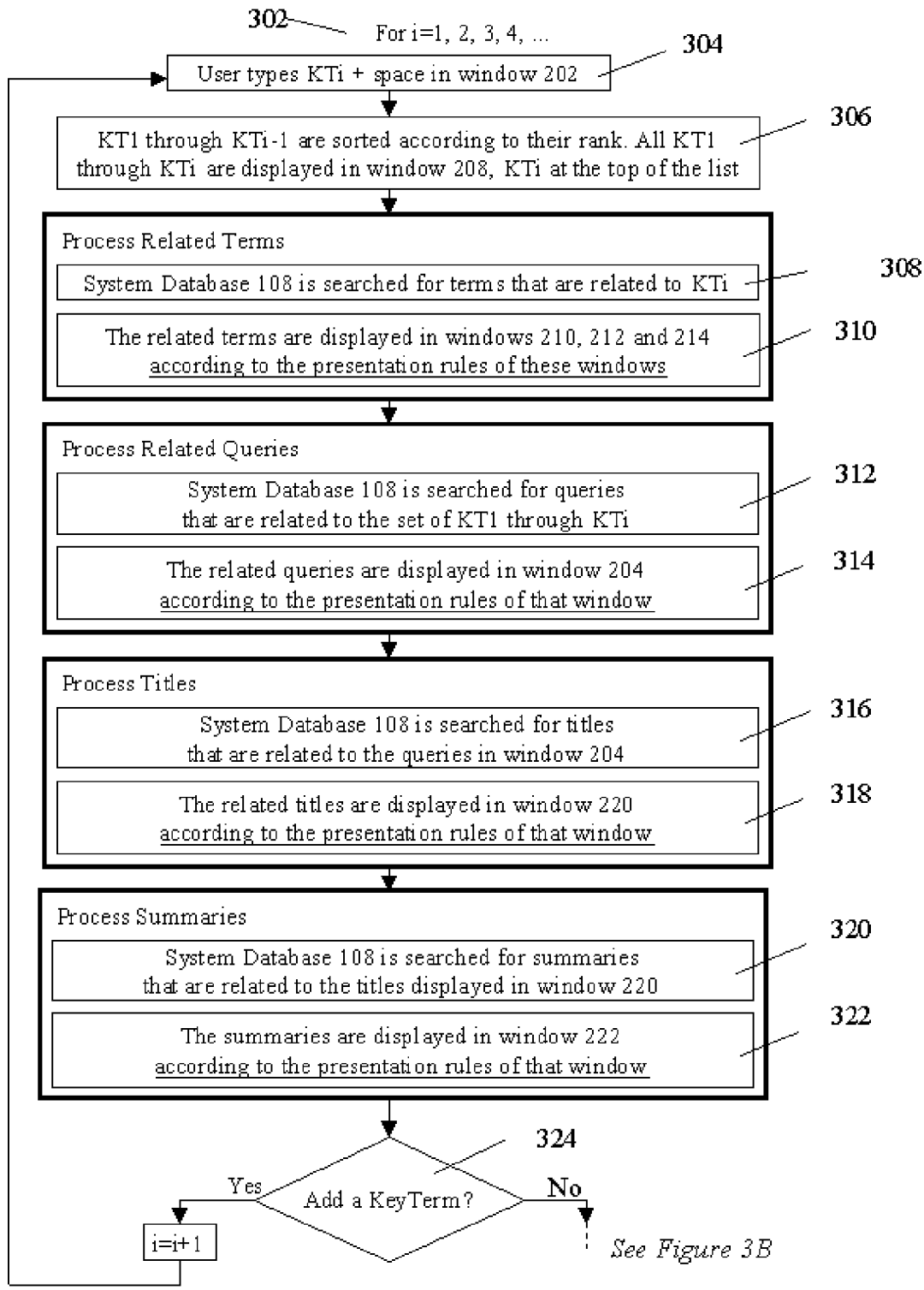
Figure 3B:
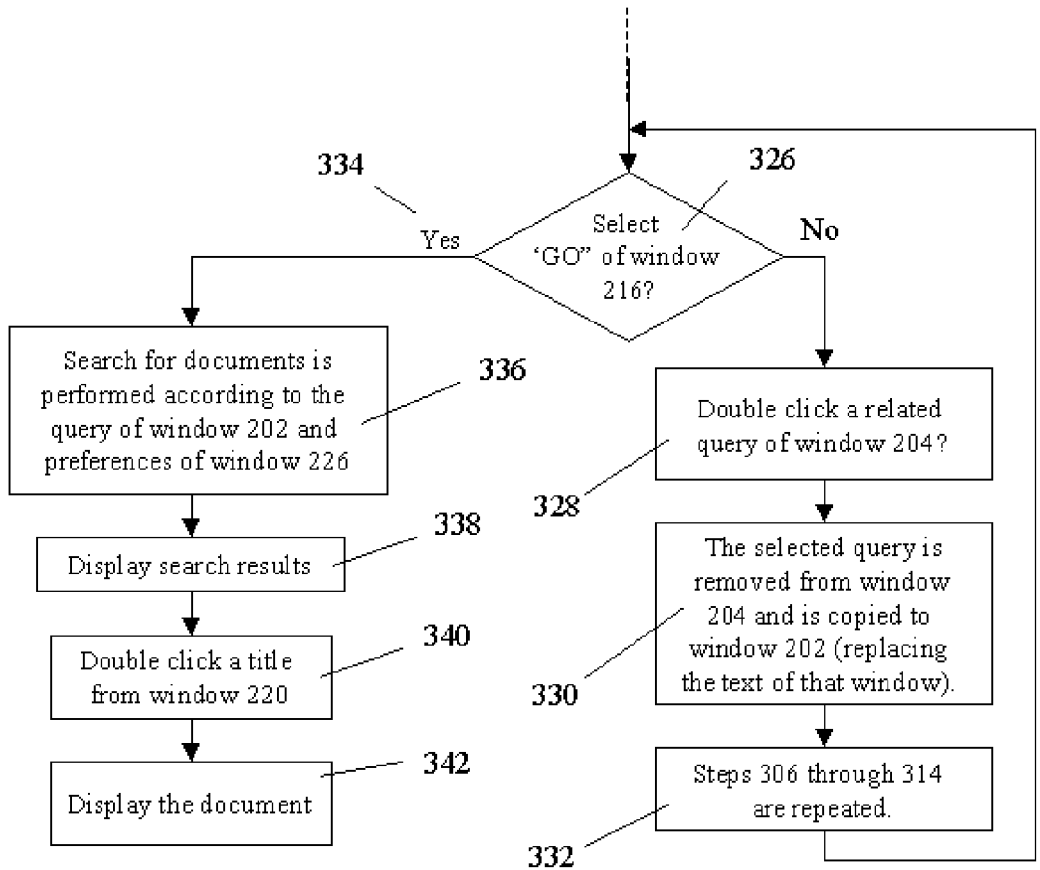

FIG. 3A and FIG. 3B (referred to as FIG. 3). A workflow chart, describing a preferred process of working with the system of the present invention.

A DETAILED DESCRIPTION OF THE INVENTION

Reference is made now to FIG. 1, which is a general description of one preferred embodiment of the system, presented in the form of a block diagram.

A preferred embodiment of the invention is presented. System 100 for search and retrieval of documents includes:

1. Server 102 which is any suitable computer such as IBM Netfinity 3000, available from IBM Corporation, North Carolina, U.S.A. with a suitable server software (Server S/W 106) such as Microsoft Windows NT, available from Microsoft Corporation, Washington, U.S.A.
2. At least one Client Station 104 which is any personal computer such as IBM PC 300XL with suitable software (Client S/W 112) such as Microsoft Windows NT (the drawing illustrates multiple Client Stations 104).
3. Server 102 includes also System Database 108.
4. Each of Client Stations 104 is connected to the Server by any means of communication 110 (such as LAN) and any standard communication protocol (such as TCP/IP).
5. Each of the Client Stations contains also Human Interface 114, such as described in details in reference to FIG. 2.
6. System 100 is also connected to at least one source of digital information 116 by communication means 118. In the preferred embodiment presented here, such a source of digital information is the Internet. This connection may be done using any method, some of the methods are described in "Using the Internet", 2nd edition by Mary Ann Pike, © 1995.

Initial Search Process:

Initial search is characterized by no data in System Database 108. At this stage System 100 can not assist the user to find the information he is looking for. In this stage System 100 traces the user's search session, collects data from the search session, processes the data and stores the results in the database.

In the present embodiment of the invention, the user composes a Boolean query using Human Interface 114. The user then submits the query to a search engine such as AltaVista. A set of titles and summaries in presented to the user by the search engine.

The user may now select some of the titles for a detailed review and ignore the others.

When the detailed document is presented to the user it is desired that the evaluation of the document, by the user, will be provided to the System. For that purpose a window is displayed with the document. The window contains a dual button interface indicating Y and N. To change from the document display back to the search session the user must click either the Y or the N. Y indicates that the document is relevant to the user and N indicates irrelevant document. System 100 also traces activities such as printing a document or saving a document on disk. These actions are considered as parts of positive evaluations of a document.

The user, repetitively composes improved queries, submits them to the search engine and evaluates results (direct or indirect evaluation). During the search session the user may submit queries to different sources such as AltaVista, Yahoo and Lycos (www.lycos.com). Also meta-search engines such as MetaCrawler (www.metacrawler.com) may be used.

When the user finishes the search session, the system has collected raw data ready for process. This data includes details such as the following:
1. Queries submitted by the user.
2. URLs of documents (URL: Uniform Resource Locator)
3. One query to many URLs relations for the URLs retrieved by each one of the submitted queries.
4. A set of evaluation parameters for each URL:
    Y, N
    Review of detailed document
    Document printed
    Document saved on storage device
    Documents summaries—those that are available.
    Document generation date, last update date
5. Date and time session ended.
6. Register indications of who, within the users group, reviewed the document.
7. Date URL introduced to System Database.

A process of the data is begun at this stage to produce a set of valuable information in the System Database, the information contains details such as:
1. Ranking each of the URLs as per the following example:
    A new URL (not exists in the System Database) acquires a preliminary rank 1.
    Add 10 points for 'Y'.
    Add 3 points for review of the document.
    Add 1 point for printing the document,
    Add 1 point for storing the document on a storage device.
    Subtract 1 point for 'N'.
    This ranking method enables increase of URL ranking either by direct or indirect evaluation by the user. Also, Rank reduction effectiveness is limited to avoid unintentional negative ranking of a URL.
2. A ranking method for a query is provided hereinbelow as an example:
    Generate ranking parameters for each submitted query:
    Number of URLs related to this query that are ranked over 0 ($n_1$).
    The sum of ranks of these URLs ($v_1$).
    Number of URLs related to this query that are ranked 0 ($n_2$).
    Number of URLs related to this query that are ranked lower then 0 ($n_3$).
    The sum of ranks of these URLs ($v_3$).
    Number of terms in the query ($T_1$).
    'Term' is used here in the broad sense. For example, a 'term' may be a single word, expression containing more then one word and a sequence of characters with indication to refer to all words and expressions containing that sequence of characters.
    A query may then be ranked using a formula such as:

$$\text{Rank} = K_1 \times (v_1/n_1) + K_2 \times (v_3/n_3) + K_3 \times T_1 \qquad (1)$$

This formula may use a relatively high value for $K_1$ to make valuable URLs more effective in ranking the query as a useful query. $K_2$ may be a relatively low value to limit the effect of irrelevant URLs retrieved by this query. This satisfies the need to reduce the rank of a query if many irrelevant URLs are retrieved by the query but, at the same time, make sure that the query maintains a good rank if it also retrieves valuable URLs.

$T_1$ is an indication for the sophistication of the query that adds to the value of such query to the user.

It would be appreciated that ranking formula (1) is an example and many other formulas may produce valuable solution.

3. Generating a set of related terms: each query is analyzed for terms related by Boolean operators such as OR, AND and NOT. This generates a many to many relations among terms of the query.
    Consider the following query example:
    (car or automobile or vehicle not bus) and (road or sand or mud).
    The following relation table may be generated:

|  | car | automobile | vehicle | bus | road | sand | mud |
|---|---|---|---|---|---|---|---|
| car | — | OR | OR | NOT | AND | AND | AND |
| automobile | OR | — | OR | NOT | AND | AND | AND |
| vehicle | OR | OR | — | NOT | AND | AND | AND |
| bus | NOT | NOT | NOT | — | NOT | NOT | NOT |
| road | AND | AND | AND | NOT | — | OR | OR |
| sand | AND | AND | AND | NOT | OR | — | OR |
| mud | AND | AND | AND | NOT | OR | OR | — |

This vocabulary, with the Boolean relations, is useful in identifying terms that are relevant to other terms, in the sense of composing a Boolean query.

For example, when the word 'vehicle' is introduced in a query, the System may use the System Database to present the user with other terms that may be useful, under the relevant category:
    OR: car, automobile
    AND: road, sand, mud
    NOT: bus The user may then use these related terms to enhance his query.

4. Ranking each of the terms. The terms may be ranked according to the number of times they appear, in relation to a given term, in all queries. The ranking may be separate for each type of Boolean relation, such as OR, AND and NOT.
    This ranking may also be modified, by weighting each appearance by the rank of the query, that generates said relation.
    This will enable to present the terms, such as 'road', 'sand' and 'mud' in appropriate order: most useful term at the top.
    It would be appreciated that a regular thesaurus will not provide such relations nor contain many professional terms (such as densitometer and "SELFOC lens"). The method of this invention generates a database containing such terms, introduced by the users during multiple search sessions.

The data collected during the search session is then stored in the System Database together with the set of parameters and calculated ranks. This also includes submitted queries, URLs, summaries, terms and their relations and ranking.

The amount of such data accumulates more rapidly when the System is multi user. This is the case in organizations, where many members of the organization search for information regarding similar subjects.

Reference is made now to FIG. 2, which demonstrates a preferred embodiment of Human Interface 114 of FIG. 1.

In order to enable a comprehensive explanation, it is assumed that an amount of data has already been collected in System Database 108 by the process described hereinabove and this data is available for assistance of searches made by individuals.

Query Composition Section:

In a preferred embodiment of the invention, Query Composition section 200 contains Query window 202 where the current query is composed and Related Queries window 204 for display of relevant queries stored in System Database 108.

Basic query composition is done in Query window 202, by typing words, expressions, Boolean operators and conventional singes. Following are some examples:

Words: car, road, table, . . .
Expressions: "racing car", "road map", "Tolman's coffee tables", . . .
Boolean operators: OR, AND, NOT, ADJ, . . .
Indefinite termination: info* stands for: (information OR inform OR Infocenter OR . . . )

Related queries are displayed in Related Queries window 204. In a simple implementation of the present invention, terms from Query window 202 are used to search System Database for stored queries that contains such terms.

The queries are displayed in Related Query window according to their rank, highest rank first.

In a more sophisticated implementation of the present invention, the queries containing terms of Query window 202 are specially ranked for display in Related Queries window 204. This ranking may first rank the queries in accordance to the number of terms from Query window 202 that are contained in these queries and then, a sub-level sorting is performed, where all queries of the same ranking are sub-sorted by their own rank (as stored in System Database 108). Other ranking schemes are possible.

In default, the top query of Related Query window 204 is highlighted. Any other query of window 204 can be highlighted by clicking on it. More then one query may be highlighted simultaneously. Double clicking a query of Query window 204 will copy the query to Query window 202, instead of what was previously in that window. Related Query window 204 will refresh then, according to the new query in Query window 202.

More queries may be observed in Related Queries window 204 by using Roll Slider 236.

The method of clicking, double clicking, highlighting, window rolling with a roll slider and other such elements are in accordance to the conventions of Windows'95 from Microsoft Corporation, Seattle, Wash., U.S.A. It will be assumed that the reader is familiar with these conventions and they will not be described here in more details.

Related Terms Section:

Related Terms section 206 within Query Composition section 200 supports the process of query composition by listing terms that are related to the terms of the query in Query window 202. Related Terms section 206 contains four windows:

1. Key Terms window 208 is used for controlling key terms. Such terms, indicated as KeyTerm1, KeyTerm2 (KT1, KT2 . . . ) are automatically selected from Query window 202, excluding Boolean operators and Boolean syntax. The user may add, remove or select any terms of window 208.

In a simplified implementation of the present invention, the terms of window 208 are presented in the same order of appearance in the query of Query window 202.

In another implementation of the invention, the terms are presented in accordance to their ranking—high ranking first.

Other sorting methods for display order are possible.

In default, the first term of Related Terms window 208 is highlighted. The user may highlight any other term. Terms may be added, edited and removed from window 208.

2. 'Or' window 210 contains terms that we are related to the terms of Key Terms window 208. The relation is established by the Boolean operator 'OR' in queries composed and stored in System Database 108 in previous search sessions. For example 'Term1' in window 210 appears in at least one query stored in System Database 108,
either in the form
    . . . KeyTerm1 OR Term1 . . .
or in the form
    . . . KeyTerm2 OR Term1 . . .

The order of the terms presented in window 210 may be according to the following sorting:

First: terms that are related to the highlighted term of window 208.

Then: terms are sorted according to their ranking (described hereinabove).

Then: terms that are related to non highlighted terms of window 208, arranged in groups of the same order as the ranking of the non highlighted terms of window 208.

Then: each of the group of terms relating to a non highlighted term of window 208 is sub-sorted according to their own ranking.

3. 'And' window 212 contains terms that we are related to the terms of Key Terms window 208. The relation is established by the Boolean operator 'AND' in queries composed and stored in System Database 108 in previous search sessions. For example 'Term4' in window 212 appears in at least one query stored in System Database 108,
either in the form
    . . . KeyTerm1 AND Term4 . . .
or in the form
    . . . KeyTerm2 AND Term4 . . .

Order of display is according to the method of window 210.

4. 'Not' window 214 contains terms that we are related to the terms of Key Terms window 208. The relation is established by the Boolean operator 'NOT' in queries composed and stored in System Database 108 in previous search sessions. For example 'Term7' in window 214 appears in at least one query stored in System Database 108,
either in the form
    . . . KeyTerm1 NOT Term7 . . .
or in the form
    . . . KeyTerm2 NOT Term7 . . .

Order of display is according to the method of window 210.

Nested Boolean relations are supported. For example, query of the type
    (A OR B) AND (C OR D) NOT (E OR F)
will generate the following relations:

| Key Term | Or | And | Not |
|---|---|---|---|
| A | B | C<br>D | E<br>F |
| B | A | C<br>D | E<br>F |
| C | D | A<br>B | E<br>F |
| D | C | A<br>B | E<br>F |
| E | F |  | A<br>B<br>C<br>D |
| F | E |  | A<br>B<br>C<br>D |

Button 'Go', 216, is used to indicate that the composition of the query is complete and the system is to retrieve information in accordance to that query.

Documents Section:

Document section 218 is used to display titles and summaries of documents in accordance to the highlighted Query in Related Queries section 204.

Title Window:

The titles of the documents are displayed in Title window 220 are titles that are highly relater to the highlighted query of window 204, Query2 in the example of FIG. 2.

The titles are available from System Database 108 and are displayed in order according to their ranking. High rank displayed first.

If the number of such titles is lower then No. of Titles 228 (20 in the example of FIG. 2), the next group of titles is extracted from System Database 108. These titles are related to the non-highlighted title with the highest rank in window 208. If this does not provide the required number of titles, the next group of titles is extracted from System Database 108. These titles are related to the non-highlighted title with the second highest rank in window 208. This procedure is repeated until the required number of titles is provided.

Each such group of titles is sub-sorted according to the rank of the titles.

Titles are also filtered for display by Which Title? window 232. In the example of FIG. 2, only New titles are presented. These are titles that have not been reviewed yet by the present user. The filtering action of the preferences is explained in more details hereinbelow, in the Preference section part.

A single click on a title of window 220 will effect the display of summaries in Summary window 222 as explained hereinbelow.

A double click on a title of window 220 will display the document of that title.

Window 224 is an indicative window that displays the URL of the highlighted title of Window 220.

Summary Window:

The summaries of the documents that are displayed in Summary window 222 are related to the list of titles in window 220. The summary of the highlighted title, Title3 of window 220 in the example of FIG. 2, is displayed in bold underlined characters, at the top of window 222, indicated as Summary3. Unused area, below Summary3, is used for summaries of subsequent tiles, as provided by the size of window 222. These summaries are presented in the same order as the titles of window 220. The roll slider of this window allows both up-rolling for summaries preceding Sammary3 and down-rolling for summaries succeeding Sammary3.

Double clicking a summary will display the document of that summary.

Preferences Section:

Preferences section 226 is used for input, by the user, of preferences for the search session. A maximum number of titles to be presented is indicated in window 228, adjustable by the user. Date Range windows 230 indicate the earliest and latest dates of that rang. Only documents that were updated in System Database 108 within this range will be presented. The dates are adjustable by the user. Which Title window 232 contains multi-choice options. Three such options may be:

1. 'New': documents that the current user did not see before the present search session—documents that are new to the current user.
2. 'Reviewed': only documents that have been reviewed by the current user in a previous session. This is useful when the user is interested in a document he reviewed in the past but does not know the location of that document.
3. 'Any': displays both 'New' and 'Reviewed' documents.

Database windows 234 indicates the database to be used by the system.

Local window 238 is used to select the preferred local database to perform as System Database 108. This may be one of few local databases or a portion of a database. The different options may be indicated by names such as:

Electronics: the portion of the database related to the electronic engineers.

Marketing: the portion of the database related to the marketing people.

All: All database.

This arrangement is described in more details in Israeli patent application number 119183 dated Sep. 2, 1996 (Haim Zvi Melman et al.).

The selected database is used during the user's interaction with the human interface of FIG. 2 including when a query is submitted for search (old or new query).

Internet window 240 is used to select the preferred Internet database sources. This is useful for submission of queries for search of new documents (or titles) that are not in the local database. Pre-configured selections of sources are available at this window.

Aided Search Session:

The aided search session will be described hereinbelow in reference to FIG. 2 and FIG. 3.

For simplicity, all elements of FIG. 2 are indicated with the digit 2 for the hundreds digit, such as 202, 206 and 214.

All elements of FIG. 3 are indicated with the digit 3 for the hundreds digit such as 302, 306 and 314.

It will be appreciated that the system can handle multiple simultaneous search sessions, conducted by different users, independently. Each user may use his own preferences configuration in Preferences window 226. The data collected from each user is added to System Database 108 to serve all users. Parts of System Database 108 may be limited for use by only few users, not accessible to others.

In this example, the preferences of window 226 will be as indicated in FIG. 2:

| No. of Titles: | 20 | |
|---|---|---|
| Which Title: | New | |
| Date Range | Earliest: | 14 Feb 97 |
| | Latest: | 01 Jan 98 |
| Source: | Local: | Mechanics |
| | Internet: | Set 5 |

1. The user types KeyTerm1 (KT1) and space in window 202 (step 304 of FIG. 3).
2. The space is interpreted by System 100 as a term separator.
3. KT1 is the only term at this stage and it is the only term (Key Term1) displayed in Key Terms window 208 (step 306 of FIG. 3).
4. System 100 is searching System Database 108 for stored terms that are related to KT1 (step 308 of FIG. 3).
5. The terms that are related to KT1 are displayed in windows 210, 212 and 214 according to the presentation rules of these windows (step 310 of FIG. 3).
6. System 100 is searching System Database 108 for stored queries that contain KT1 (step 312 of FIG. 3).
7. The selected queries are displayed in window 204 according to the display rules of that window (step 314 of FIG. 3). First query is highlighted by default. Another query can be highlighted by the user by a single click on the query.
8. In step 316 System Database 108 is searched for titles that are related to the queries of window 204.
9. The related titles are displayed in window 220 according to the display rules of that window (step 318 of FIG. 3).). First title is highlighted by default. Another title can be highlighted by the user by a single click on the title.
10. System 100 is searching System Database 108 for stored summaries associated with the titles of window 220 (step 320 of FIG. 3).
11. The selected summaries are displayed in window 222 according to the display rules of that window (step 322 of FIG. 3).
12. The user may now select to add a Key Term in window 202 either by typing in the term or by selecting a Term from any of windows 210, 212 and 214 by double clicking a Term. If he double clicks a term from said window, the Term will be added to the term in window 202 together with its' Boolean operator: OR, AND or NOT, according to the window from which the term was selected. This term will be added as Key Term2 (KT2) to window 202.
The user may introduce editorial changes to the content of window 202 such as changing the Key Terms or the Boolean operators.
13. System 100 repeats steps 306 through 322 of FIG. 3, applying all the display rules of the relevant windows.
14. The above process is repeated until the user is satisfied with the query he composed or by one of the queries displayed in window 204.
15. At this stage the user has made his choice of a query (326 of FIG. 3B). If his decision is for a query from window 204, the user will double click that query (step 328). The selected query is copied to window 202, replacing the text that was previously there (step 330). Steps 306 through 322 are repeated by System 100 (step 332).
It will be appreciated that the user may edit the query in window 202 even if it was copied there from window 204 or double click another query of window 204.
16. If the user is satisfied with the query of window 202 and has not found yet the information he is looking for in System Database 108 (as specified by the reference window 226), window 216 is clicked once (step 334).
17. System 100 performs then a search for documents in accordance with the query of window 202 and preferences of window 226. The search is limited to sources specified in windows 238 and 240, filtering out documents outside of Date Range 230 and documents that have been seen in the past by the current user, as required by window 232 (step 336).
18. In step 338 the search results are displayed in windows 220 (titles) and 222 (summaries). Summaries of documents that are new to the database may be extracts from the document by a variety of methods such as reading the content of the relevant Meta Tag in an html file type or just reading the first few lines of the document.
19. The user may select a summary and double click it (step 340).
20. The selected document is displayed in a dedicated window, such as a Netscape browser window (step 342).

The user may view documents, step back to the search process modifying his search activity in a variety of ways such as composing new queries, editing queries and changing preferences of window 226.

Following predetermined conditions (such as every 10 minutes or end of search session or every logout) System 100 is processing the new search information and generates new data for System Database 108. This data is added to the previously stored data for future aided search-sessions, as described hereinabove (section of Initial search process).

Simple queries such as of one or two Key Terms are the most intuitive and are frequently the first ones composed in a search session. In another embodiment of the invention, the user may submit such a simple query that in a present art search system will fail to produce useful results and provide many falls results. In the present invention, submission of such a query will actually result in submission of a number of more sophisticated queries, these are Related Queries available from System Database 108. These queries may be those of a rank above a predetermined threshold. The results will be those that are associated with the highly ranked Related Queries. This methods enables valuable results from a simple and intuitive query—not effective by itself.

A method is presented hereinbelow, to associate such simple queries that, in most cases, do not provide the desired results, with more sophisticated queries that are usually not intuitive and are composed only after few interaction with search results and query modifications accordingly.

A search session is defined to be the process of searching information related to a specific subject. A search session includes the composing of queries, submission of queries to a search engine, evaluation of results, modification of queries as a response to such search results, submission of such modified queries—and so on.

Two sessions are different if the subject is different.

In the present embodiment of the invention, semi-automatic session tracing is performed by the system. Queries are identified to belong to the same search session in the following way:

New search session starts by a query (normally after the application is activated). Each new or modified query is compared to all the previous queries. If at least one keyword of this query is used in one of the previous queries of that session—the new query is belongs of the same session.

If the user go through strategy change in his queries there may be no keyword relation anymore to previous queries even if this is the same search session. For example, a user may search for information on 35 mm film dimensions. He may start with a query "film and 35 mm" and change strategy to search for standard organizations with the query "iso". To overcome this problem in the present embodiment, when this occurs, the system responds to the user with a question: "Have you started a new search session? Y/N". If the user answers "N" the queries "film and 35 mm" and "iso" are associated with the same search session. Next time that the query "film and 35 mm" will be composed by a user, a reference will also be made to the query "iso" as a relevant query. Useful titles retrieved by the query "iso" will be available then also for the query "film and 35 mm".

If the user replies "Y", the previous set of queries are associated with one search session while the new query is the first one of the new search session.

In yet another embodiment of the invention, the data that is collected and processed trough the search sessions is used to generate and support direct information exchange and communication among the members of an organization.

As described hereinabove, during the search session Related Queries and Titles from System Database 108 are associated with the search activity of the user. Since such queries and titles are related also to other users who used them in the past, the names of such users can be presented to the current user for user to user communication.

In the present example, after the user has worked through at least a part of his search session, such a relation to Related Queries and Titles of System Database 108 has been established. The user interface of FIG. 2 may contain "Names" indicator. By clicking this indicator, System 100, opens a new window.

This window contains names, email addresses and phone numbers of the users who used the Related Queries and Titles in the past.

The order of names in the window may by according to the order of Related Queries of window 236 of FIG. 2. Where two or more names are related to a query the order of presentation of these names would be according to the number of Related Queries with which the names are associated, names associated with more queries to appear first.

The names are adjacent to checkboxes. The user may now, for example, use the checkboxes to select a subgroup of the names and then select an Email option. An email form addressed to the checked names will be opened. The user may then write an email to this group of user, asking for more information about their activity in the subject of his search session.

Of course, the user may also select to use the phone numbers to call these people.

An example that highlights the usefulness of this method is provided hereinbelow: A user may look for an international standard in a specific matter. By looking at the ISO Internet site (www.iso.ch) He may find a reference to the standard he needs but the standard itself is not available there. The standard has to be ordered separately, be paid for and delivered by mail.

In this example the user may place a relevant query in query window 202 in order to get names of people, in the organization, who are involved in that subject. Then he can email them an inquiry to find whether they have in possession the requested document. By doing so he may shorten the time and cost to get the required document.

It would be appreciated by those skilled in the art that efficiency of System 100 depends on the computers in use, communication networks and other device parameters.

The flow of process, as described hereinabove may be modified to suit less efficient devices by avoiding updating the windows of FIG. 2 following any change in any window. Instead, update may be performed as a response to a predetermined partial group of changes or only by an explicit request from the user.

It is also appreciated that non-Boolean query systems, such as Natural Language Queries, may be used in the present invention.

The hereinabove embodiments are described in a way of example and do does not specify a limited the scope of the invention.

The scope of the invention is defined solely by the claims provided hereinbelow:

The invention claimed is:

1. A computer based method for creating a database, the method comprising:
   receiving at least one search query including at least two terms;
   storing said at least one search query as a stored query;
   searching for and displaying at least one stored query as submitted that includes at least one term included in said received search query; and
   storing the terms, included in said at least one search query, as related terms in a database, wherein related terms are terms that appeared in a same query.

2. The method of claim 1, whereas at least a portion of said queries has limited access to certain users.

3. The method of claim 1, comprising storing, in association with two related terms, a Boolean relation as it appeared in said same query.

4. The method of claim 1, comprising storing in relation to said received query information on at least one user who used said query.

5. The method of claim 1, including ranking said stored search queries.

6. The method of claim 1, wherein the queries are displayed as submitted.

7. A computer based method for performing searches for queries and terms, the method comprising:
   receiving a search query including at least one previously received term to search for documents;
   searching for stored queries that were stored as submitted and include at least one term included in said received search query;
   searching for terms related to the received term in the received query, wherein a term related to the received term is a term that appeared together with said received term in a same query; and
   displaying the results of at least one of said searches for stored queries and related terms.

8. The method of claim 7, comprising receiving a command selecting at least one of said related terms and modifying the search query by adding said selected at least one of said related terms to the search query.

9. The method of claim 8, comprising performing a search for documents based on the modified query.

10. The method according to claim 8, wherein said modifying comprises adding said selected displayed related term to said received query with a stored Boolean relation.

11. The method of claim 7, wherein said displaying comprises displaying said stored related terms in groups according to a stored Boolean relation and the received term as it appear in said same query.

12. The method of claim 11, comprising:
   receiving a command selecting a displayed related term; and
   modifying said received query by adding said selected displayed related term to said received query with said Boolean relation.

13. The method of claim 12, comprising performing a search for documents based on the modified query.

14. The method of claim 11, comprising ranking said stored related terms separately for different Boolean relations, and wherein said displaying is in an order according to the separate ranking.

15. The method of claim 7, comprising selecting a database of terms from a plurality of databases, and wherein said searching is in the selected database.

16. The method of claim 7, comprising ranking said stored related terms and displaying said stored related terms in an order according to ranking of at least one stored related term.

17. The method of claim 7, comprising ranking said search queries and displaying stored search queries in an order according to a ranking of at least one stored query.

18. The method of claim 7, comprising providing information on at least one user who used at least one of said displayed stored queries.

19. The method of claim 7, comprising selecting a portion of a database of terms and wherein said searching is in the said selected portion of said database.

20. The method of claim 7, comprising modifying the received query by adding at least one of the said stored related terms to said received query to create a modified query.

21. The method of claim 20, comprising performing a search for documents with said modified query.

22. The method of claim 20, comprising displaying said modified query.

23. The method of claim 20, wherein said modifying is according to a ranking of a stored query including said added related term.

24. The method of claim 7, including displaying the results of both of said searches for stored queries and related terms.

25. The method of claim 7, wherein the queries are displayed as submitted.

26. A computer based method for creating a database, the method comprising:
   receiving at least one search query including at least two terms;
   storing said at least one search query so as to be displayed as submitted;
   storing the terms, included in said at least one search query, as related terms in a database, wherein related terms are terms that appeared in a same query; and
   storing information on at least one user who used said search query and the related terms.

27. The method of claim 26, comprising storing a rank of at least one search query with relation to said at least one search query.

28. The method of claim 26, wherein the information on at least one user is information on a group of users who used said search query and the related terms.

29. The method of claim 26, wherein the search queries are stored so as to be displayed as submitted.

* * * * *